Oct. 20, 1970    A. J. HILGERT    3,534,611
TEMPERATURE SENSING APPARATUS HAVING AMBIENT
TEMPERATURE COMPENSATION MEANS
Filed Feb. 23, 1968
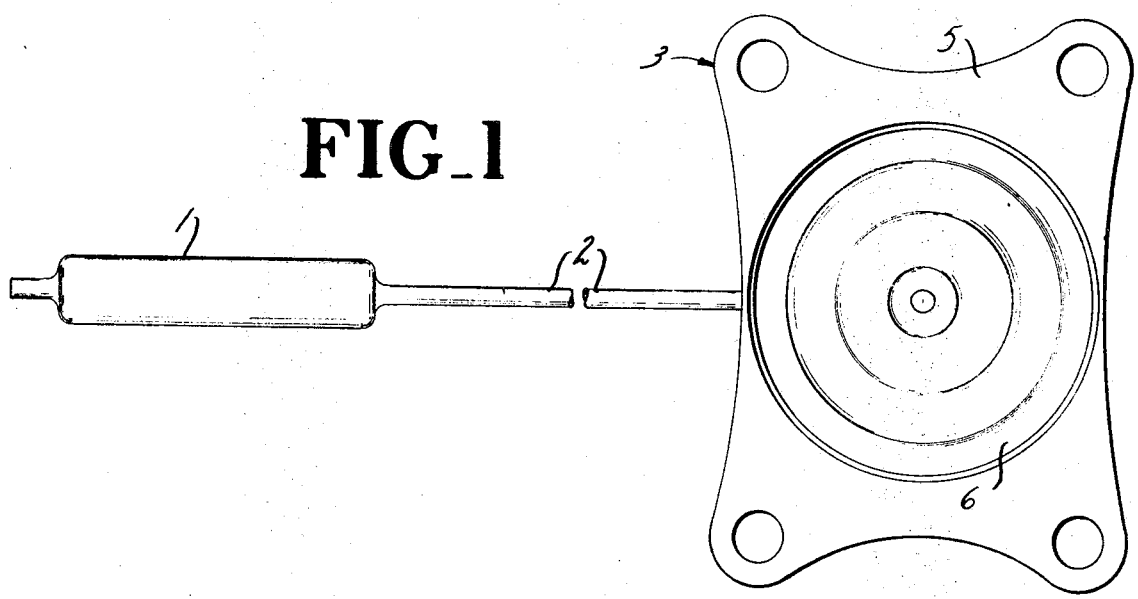
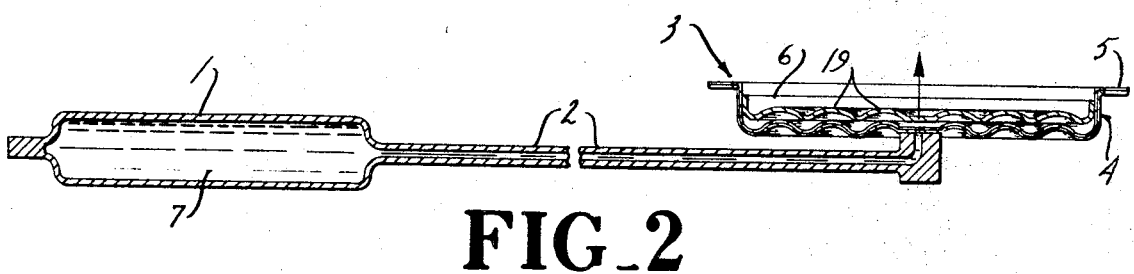
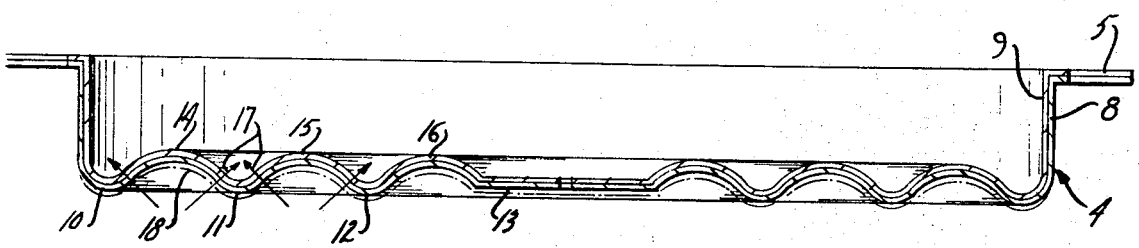
INVENTOR.
ADOLPH J. HILGERT
BY
Andrus & Starke
Attorneys

United States Patent Office 3,534,611
Patented Oct. 20, 1970

3,534,611
TEMPERATURE SENSING APPARATUS HAVING AMBIENT TEMPERATURE COMPENSATION MEANS
Adolph J. Hilgert, Mequon, Wis., assignor to Johnson Service Company, Milwaukee, Wis., a corporation of Wisconsin
Filed Feb. 23, 1968, Ser. No. 707,505
Int. Cl. G01k 1/20
U.S. Cl. 73—362.5                                    6 Claims

ABSTRACT OF THE DISCLOSURE

Temperature sensing bulb is connected by a capillary tube to a diaphragm head. A temperature responsive liquid fills the sensing bulb, the capillary tube and the head. One wall of the head includes a movable diaphragm to produce a mechanical output in accordance with the expansion and contraction of the confined liquid. The opposed wall is a bimetal wall having plurality of annular convolutions producing alternately interconnected convex and concave loops. The annular convolutions are symmertically located but the concave loops which open exteriorly are large relative to the convex loops. The concave loops produce a somewhat greater force than the outer convex loops with a resulting outward deflection of the bimetal wall in response to increasing temperatures to increase the volume of the housing. The volume of the liquid within the hood is selected such that under normal operating temperature of the bulb and normal ambient temperature ranges to which the head is subjected, the volumetric expansion of the liquid within the head will correspond to the volumetric change produced by the deflection of the bimetal wall of the housing. This maintains the diaphragm with zero deflection in the presence of ambient temperature changes.

---

This invention relates to temperature sensing apparatus and particularly to a temperature sensing apparatus employing expansion and contraction of a fluid medium to transmit a temperature change and having means to automatically compensate for changes in the volume of the sensing fluid as a result of ambient temperature conditions.

Temperature responsive systems of one variety employ the expansion and contraction of a confined fluid and generally a liquid to produce a mechanical output proportional to temperature changes. In a known hydraulic temperature sensing system a sensor such as a bulb is connected by a capillary tube to a diaphragm head or housing. A suitable liquid fills the sensing bulb, the capillary tube and the head. One wall of the head includes a movable diaphragm to produce a mechanical output in accordance with the expansion and contraction of the confined liquid. Any expansion of the liquid results in a corresponding movement of the diaphragm. Conversely, contraction results in an opposite movement of the diaphragm. The mechanical movement of the diaphragm may be interconnected in any suitable manner to actuate a load device such as a switch, a fluid control, a recording device or the like.

The system is generally constructed such that neither the head, the tube or the bulb changes its volume to any detectable degree with changes in temperature. The expansion and contraction of the liquid with temperature at the bulb results in movement through the capillary tube into and from the head to move the diaphragm. However, any temperature change of the liquid in the capillary and/or the head results in a corresponding diaphragm deflection whereas the diaphragm should deflect only with the changes in the bulb temperature. Although capillary tubes generally have a very small inside diameter to minimize the liquid volume and thus minimize the error as a result of ambient temperature, the heads are generally made of a substantial area and, therefore, volume in order to produce the desired output movement of the diaphragm. Consequently, ambient temperature changes at the head may result in a substantial error.

The present invention is particularly directed to a special construction of the head to establish expansion and contraction of the head by the amount of liquid expansion and contraction as a result of ambient temperature changes. The diaphragm is then maintained in the set position and affected only by actual changes in bulb temperature.

Generally, in accordance wtih the present invention, the automatic compensation is provided by forming at least a portion of the housing or head of a material which changes its configuration with temperature changes and which is mounted in the head to compensate directly and correspondingly for the volumetric change in the liquid within the head. Applicant has found that formation of the head or housing with a bimetal wall is a particularly satisfactory construction. In accordance with a particularly novel aspect of the present invention, the housing is formed wtih a bimetal wall having plurality of convolutions producing alternately interconnected convex- and concave portions. The convolutions are so arranged that the wall moves normal to its set position and changes the volume directly in accordance with and proportional to the volumetric change of the liquid in the head. The bimetal wall is preferably formed with an inner low expansion metal and with a plurality of annular convolutions symmetrically located but with the concave loops or portions which open exteriorly of the housing being as large as practical and the outer convex portions which open into the housing as small as practical. The concave loops will produce a somewhat greater force than the small outer convex loop with a resulting outward deflection of the bimetal wall in response to increasing temperatures and thereby increase the volume of the housing. The volume of the liquid within the head is selected such that under normal operating temperature of the bulb and normal ambient temperature ranges to which the head is subjected, the volumetric expansion of the liquid within the head will correspond to the volumetric change produced by the deflection of the bimetal wall of the housing. This maintains the diaphragm with zero deflection in the presence of ambient temperature changes.

The drawing furnished herewith illustrates a preferred construction of the present invention in which the above advantages and structures are clearly disclosed as well as others which will be clear from the following description.

In the drawing:

FIG. 1 is a top view of a temperature sensing assembly constructed in accordance with the present invention;

FIG. 2 is an enlarged vertical section through the assembly shown in FIG. 1;

FIG. 3 is an enlarged view showing the bimetal housing structure.

Referring to the drawings and particularly to FIGS. 1 and 2, the illustrated temperature sensing assembly includes a sensing bulb 1 interconnected by a capillary tube 2 to a metal housing or head 3. The illustrated head 3 includes an outer cup-shaped wall 4 having an encircling mounting flange 5. A cup-shaped diaphragm 6 is secured telescoped within the cup-shaped wall 4 with the base portions slightly spaced from each other to define a chamber communicating via the tube 2 with bulb 1. The bulb 1, the capillary tube 2 and the chamber within the head are filled with a suitable temperature sensitive liquid 7. The bulb 1 and the capillary tube 2 are formed of a suitable material that will not essentially change configuration with temperature. Changes in the sensed temperature at the bulb 1 however results in an appreciable change in the volume of the confined liquid 7 which is transmitted through the capillary tube 2 to the head 3 to cause a corresponding deflection of the diaphragm 6. The central portion of the diaphragm 6 provides a mechanical movement which may be connected to any suitable device such as a recording device, a switch or other suitable load as diagrammatically shown by the force or output arrow.

The present invention is directed to the construction of wall 4 of the head 3 and particularly the base portion thereof in the illustrated embodiment of the invention to provide automatic compensation for volumetric change of the liquid 7 within the head 3 with ambient temperature changes.

In the illustrated embodiment of the invention the wall 4 is formed as a bimetal element including an outer high expansion metal member 8 and an inner lower expansion metal member 9 intimately secured to the high expansion wall in accordance with well known bimetal construction. The bimetal wall members 8 and 9 are each formed with a plurality of circular convolutions defining three outer convex loops 10, 11 and 12 interconnected to each other and to a central disc portion 13 by three inner concave loops 14, 15 and 16. The concave loops 14–16 are made substantially larger than the convex loops 10–12. As a result of the location of the low expansion metal member 9 as the inner surface, the deflection of each of the loops 10–12 and 14–16 will similarly be with the outer limiting ends of the loops moving in a corresponding direction. The convex loops 10–12 will tend to close while the concave loops 14–16 will tend to expand or flatten out with increasing temperature. The direction of movement is shown in FIG. 3 by a plurality of force arrows 17, normal to the common junctions or connections of the convex and concave loops.

The relative difference in the size of the convolutions is important in providing a practical movement of the head wall 4 to compensate for normal volumetric changes. If the convex and concave loops 10–12 and 14–16 are essentially of the same magnitude or size, temperature changes result in essentially a corresponding movement of the convex and concave loop portions. As a result, the convex loops close by an amount essentially equal to the amount the concave loops open in response to a given temperature rise. The only portion which would have any net deflection is the small central disc portion 13. The amount of this deflection alone may not provide sufficient compensation for accurate control in practical sensing systems.

The fact that concave loops 14–16 are somewhat larger than the convex loops 10–12 results in a net force which moves the bimetal base of wall 4 outwardly in a generally axially direction, such as shown by the dotted line position 18 in FIG. 3. By proper selection of the volume of the chamber in the head 3 between the diaphragm 6 and the wall 4 which is filled with the liquid 7, the volumetric expansion of the liquid 7 in the head 3 with an increasing ambient temperature is made to correspond to the volumetric increase produced by the deflection of the convoluted wall of the head 3. As a result, the diaphragm 6 does not move with ambient temperature, at least over a selected range. The convoluted construction stiffens the wall 4 and permits use of relatively thin bimetal elements which have been found to produce accurately controlled and essentially identical repeated movement of the wall with changes in ambient temperature.

In the illustrated embodiment of the invention, the cup-shaped diaphragm 6 is formed with a plurality of convolutions 19 mating with the convolutions of the outer wall 4 of the head 3 to minimize the total volume while permitting inward movement of the diaphragm. The volume of the liquid 7 in the head 3 is normally selected to allow movement of the diaphragm over a given range above and below the normal room temperature at which the system is filled.

A system may, for example, be constructed to cover a range of —40° to 350° Fahrenheit sensed temperature at bulb 2. The inward movement of the diaphragm 6 is limited by the shortest distance between the diaphragm and the wall 4. Without the mating convolutions, a greater volume of liquid is present than with the convolutions for the same movement of the diaphragm. A greater volume of liquid 7 in the head 3 would of course require greater compensation for ambient temperature conditions.

In the operation of the system, the capillary tube 2 may, of course, also be subject to ambient temperature variations. The volume of liquid 7 in the tube 2 is relatively small and any error is consequently minimal. Further, in the illustrated embodiment of the invention, the stiffness of the bimetal wall 4 generally permits a very slight movement of wall 4 as a result of movement of liquid from the capillary tube 2 into the chamber of head 3. The movement of liquid from the capillary tube 2 as a result of ambient temperature variations at tube 2 therefore establishes a lesser movement of the diaphragm than with a rigid head structure. In fact, the movement of the head wall 4 under the pressure of the incoming liquid from the capillary reduces the ambient error from the capillary. Any consequent loss of movement of the diaphragm 6 from this head deflection may always be corrected by increasing the volume of the bulb. This effect does not interfere with the normal operative movement of the diaphragm 6 in response to sensed temperature changes by the bulb 2 because of the much greater volume of liquid within the bulb 2 and the resulting volumetric change with respect to the volume in the tube 2 and head 3.

As a result of the present invention any change in the ambient temperature at the head 3 will simultaneously establish movement of the convoluted wall 4 of the housing in accordance with the volumetric change of the liquid 7 within the head and consequently maintain essentially zero deflection of the diaphragm 6 as a result of such ambient temperature changes. On the other hand, any change in the sense temperature by the sensing bulb 1 results in a volumetric change in the liquid 7 within the bulb 1 which is transmitted through the capillary tube 2 directly to the liquid in the head with a corresponding deflection of the diaphragm 6.

The present invention thus provides an improved hydraulic sensing apparatus for use in temperature responsive systems.

Various modes of carrying out the invention are contemplated as being within the scope of the following claims particularly pointing out and distinctly claiming the subject matter which is regarded as the invention.

I claim:

1. Temperature sensing apparatus having a sensing member connected by a conduit means to a spaced head member having a chamber, said apparatus having a fluid medium filling said sensing member, said conduit means and the chamber of said head member and transmitting changes in temperature at said sensing member to said head member as a volumetric change in said fluid medium, said chamber being formed by a cup-shaped wall and a movable wall member connected to said cup-shaped wall, said movable wall being positioned by the expansion and contraction of the fluid medium and in accordance with the temperature applied to the fluid medium, said cup-shaped wall including an integral bimetal wall portion which deflects proportionally outwardly of the chamber with increasing temperature at the head member and inwardly of the chamber with decreasing temperature at the head member to compensate for the volumetric change of the fluid medium in the head member with temperature at the head member.

2. Temperature sensing apparatus having a liquid filled sensing member coupled by a conduit means to a liquid filled chamber in a head member, a temperature-sensitive liquid filling said sensing member, conduit means and chamber, said head member including a bimetal wall forming a part of said chamber and said bimetal wall having a plurality of alternate concave and convex bimetal portions of different curvature, said bimetal wall having an inner low expansion metal and an outer high expansion metal to compensate for the volumetric change of the liquid in the head member with changes in temperature at the head member.

3. The temperature sensing apparatus of claim 2 wherein said head member includes a movable diaphragm forming a part of said chamber and the bimetal wall being spaced and parallel to the movable diaphragm and defining the liquid filled chamber connected to said conduit means.

4. The temperature sensing apparatus of claim 2 wherein said head member includes a diaphragm secured to said bimetal wall and spaced therefrom to define the liquid filled chamber communicating with a capillary tube as said conduit means, said bimetal wall including a plurality of generally coplanar alternate convex loops and concave loops interconnected to define a continuous bimetal wall, corresponding alternate loops being substantially wider than the other corresponding alternate loops whereby said chamber expands with increasing ambient temperature to compensate for the increased volume of the liquid within said chamber.

5. The temperature sensing apparatus of claim 2 wherein said head includes an outer cup-shaped wall having a mounting flange and a cup-shaped diaphragm secured within said wall and spaced from the base portion to define a substantial liquid chamber communicating with a capillary tube as said conduit means, said base portion including said bimetal wall and having a high coefficient expansion metal as the interior metal, said base portion including an even plurality of alternate outer convex and inner concave loops interconnected to define a continuous generally coplanar bimetal wall, said concave convolutions being substantially wider than said convex convolutions whereby said housing expands with increasing ambient temperature to compensate for the increased volume of the liquid within said chamber.

6. The temperature sensing apparatus of claim 1 wherein said head includes an outer wall and a spaced essentially parallel diaphragm defining a substantial liquid chamber communicating with a capillary tube as said conduit means, said outer wall constituting said bimetal wall and being a continuous bimetal element having a high coefficient expansion metal as the exterior metal and a low coefficient expansion metal as the interior metal, said outer wall including a plurality of spaced annular outer convex loops and a plurality of interposed annular inner concave loops interconnected to define a convoluted wall having a central disc portion, said concave loops being substantially wider than said convex loops whereby said wall expands with increasing ambient temperature to compensate for the increased volume of the liquid within said chamber.

References Cited

UNITED STATES PATENTS

| | | | |
|---|---|---|---|
| 2,235,314 | 3/1941 | Diggins et al. | 73—362.4 X |
| 2,846,884 | 8/1958 | Daly | 73—362.4 |
| 3,004,434 | 10/1961 | Heise | 73—393 X |
| 3,082,626 | 3/1963 | Perkins | 73—362.4 X |
| 3,266,324 | 8/1966 | Jewell | 73—393 X |

FOREIGN PATENTS

| | | |
|---|---|---|
| 824,610 | 2/1939 | France. |

LOUIS R. PRINCE, Primary Examiner

D. M. YASICH, Assistant Examiner

U.S. Cl. X.R.

73—368.4, 368.7